United States Patent [19]
Heinrich

[11] Patent Number: 6,104,728
[45] Date of Patent: Aug. 15, 2000

[54] DEVICE FOR SELECTING ADDRESS WORDS BY DEMULTIPLEX DECODING

[75] Inventor: Peter Heinrich, Rosenheim, Germany

[73] Assignee: STMicroelectronics GmbH, Grasbrunnm, Germany

[21] Appl. No.: 08/960,846

[22] Filed: Oct. 30, 1997

[30] Foreign Application Priority Data

Oct. 31, 1996 [DE] Germany .............. 196 45 057

[51] Int. Cl.$^7$ ...................................... H04J 3/24
[52] U.S. Cl. ................... 370/475; 370/392; 340/825.52; 707/6
[58] Field of Search .................. 370/389, 392, 370/401–405, 475; 340/825.52; 707/6

[56] References Cited

U.S. PATENT DOCUMENTS

| | | | |
|---|---|---|---|
| 4,788,507 | 11/1988 | Berkowitz et al. ........... | 328/151 |
| 5,276,683 | 1/1994 | Ohkubo .................. | 340/825.52 |
| 5,305,321 | 4/1994 | Crayford ................. | 370/389 |
| 5,379,289 | 1/1995 | DeSouza et al. ............ | 370/401 |
| 5,467,349 | 11/1995 | Huey et al. ............... | 370/397 |
| 6,021,121 | 2/2000 | Heinrich ................. | 707/6 |

FOREIGN PATENT DOCUMENTS 0 325 670   8/1989   European Pat. Off. .

OTHER PUBLICATIONS

Etschberger, Konrad, CAN, Controller–Area–Network, *Grundlagen, Protokolle*, Bausteine, Anwendungen, pp. 25–26, 37–43, 113–114.

*Primary Examiner*—Chi H. Pham
*Assistant Examiner*—Maikhanh Tran
*Attorney, Agent, or Firm*—Theodore E. Galanthay; David V. Carlson; Seed IP Law Group PLLC

[57] ABSTRACT

A device for selection of address words, each having n bit locations and serving for addressing m different receiving locations of a digital communications apparatus, comprising a digital acceptance device via which address words can be selected which are acceptable for the particular receiving location in consideration. The acceptance device includes an address word segmenting device through which each address word received by the receiving location is subdivided into s address word segments with b segment bit locations each, wherein b=n/s and n is an integral multiple of s, a decoder having a decoder input accepting the bit pattern of the address word segment of the particular address word being examined for acceptance, and having a decoder output at which, for each of the possible segment bit patterns, a decoder output bit pattern representing only this segment bit pattern is available. The device also includes s filter registers associated with one of the address word segments each, for storing filter register bit patterns, a comparison circuit through which the decoder output bit pattern can be compared with the contents of the associated filter register, the output providing an examination result signal which is either a conformity signal or a nonconformity signal. The device also includes an evaluation circuit, that delivers an acceptance signal only when a conformity signal has been present at the output of the comparison circuit for each address word segment of this address word.

21 Claims, 4 Drawing Sheets

DEVICE FOR SELECTING ADDRESS WORDS BY DEMULTIPLEX DECODING

CROSS-REFERENCE TO RELATED APPLICATIONS

The following pending U.S. Patent Applications by Peter Heinrich entitled: "Device For And Method Of Selecting Address Words," Ser. No. 08/962,978, (Attorney Docket No. 857063.428), filed Oct. 30, 1997, claiming priority based on German Patent Application No. 196 45 054.3, filed Oct. 31, 1996; and "Electric Circuit Arrangement for the Serial Evaluation of a Bit Sequence", Ser. No. 08/960,944, Attorney's Docket No. 857063.430), filed Oct. 30, 1997, claiming priority based on German Patent Application No. 196 45 055.1, filed Oct. 31, 1996, have the same ownership as the present application and to that extent are related to the present application and are incorporated herein by reference.

FIELD OF THE INVENTION

The invention relates to a device for and a method of selecting address words, each having n bit locations and serving for addressing m different receiving locations of a digital communications means, in at least one of the receiving locations.

BACKGROUND OF THE INVENTION

It is usual nowadays, in a system having one or more transmitting locations and several receiving locations, to send a signal transmitted from a transmitting location to all receiving locations via a common transmission channel, for instance via a bus line. To allow sending a message from the transmitting location to only one receiving location, the signals transmitted to the receiving location each contain an address word in addition to the message to be transferred. Each of the receiving locations has at least one specific address word associated therewith. The individual receiving locations comprise devices for the selection of the respective address words associated therewith. The receiving location for which the particular message is intended can thus take such messages from the transmission channel which are provided with a data word that is intended for or acceptable to these receiving locations.

If several receivers belong to one receiving location, it is possible to associate a unique address word with each of these receivers. If certain messages are to be receivable by several receiving locations, each of these receiving locations not only accepts its own address word but also additional address words. In these cases, the receiving location is designed such that it accepts several address words.

To determine whether the address word of the message transmitted over the transmission channel, for instance the bus line, is intended for a specific receiving location or not, the address word of the message is compared in the receiving location with the data word or words associated with this receiving location. This takes place conventionally via filters having, just like the address words, n bit locations, in which a bit sequence corresponds to the bit sequence of an acceptable address word. If the particular receiving location is to be capable of accepting several address words, it requires as many filters with n bit locations each as there are acceptable address words. The address word of each message offered to the individual receiving location is compared with each bit sequence in each filter of this receiving location for conformity or non-conformity. If there is conformity with respect to one of the filters, the received address word is accepted and the message appended to this address word is allowed to pass to load units of this receiving location. If the received address word is not in conformity with the bit sequence stored in one of the filters, this address word is not accepted and the message accompanying this address word does not reach load units of this receiving location.

Load units are, for instance, display devices or actuators.

To determine whether or not a received address word conforms with the bit sequence stored in the filter, XOR gate circuits are conventionally used, namely one such circuit for each bit location of address word and filter. For example, when the address word has 12 bit locations, the filter has also 12 bit locations, and 12 XOR gate circuits are necessary for the comparison of the respective address received with the bit sequence stored in the filter. The outputs of all XOR elements are passed to an OR element having as many inputs as there are XOR elements. At an output of the OR element, the logic value "0" or the logic value "1" appears depending on whether or not the received address word conforms to the word stored in the filter. The logic value "0" at the output of the OR element means thus that the received address word is accepted by the receiving location being considered, whereas it is not accepted when the logic value "1" appears at the output of the OR element.

In case of the above-described conventional solution, each one of the several filters of a receiving location has a filter length equal to the address word length. This requires hardware with a capacity which one possibly would not like to provide for reasons of costs. Additionally, many word lines are necessary between the address register, in which the address for the filter comparison is stored temporarily, the filters, the XOR elements used for the comparison and the OR element connected downstream thereof. These word lines require a lot of space on a monolithically integrated semiconductor circuit. XOR elements also require relatively large areas on semiconductor chips.

If in the known acceptance examination method, for example four different address words are to be accepted for one specific receiving location, two filters must be provided in this receiving location each having a filter length equal to the address word length. With an address word length of for instance 12 bit locations, 24 filter locations are required in this case. In addition thereto, one needs a correspondingly large amount of XOR elements and word lines with a correspondingly high requirement of space on the semiconductor chip on which the address selection device is provided.

SUMMARY OF THE INVENTION

An object of the present invention is to reduce the circuit expenditure for the acceptance examination of address words received, in particular in such a manner that chip area can be saved.

The invention provides a device via which it is possible, in a receiving location of a digital communications apparatus, to have selected address words which each have n bit locations and serve for addressing m different receiving locations of the communications apparatus. The device includes a digital acceptance device through which address words can be selected that are acceptable for the receiving location in consideration. The acceptance device comprises:

an address word segmenting circuit through which each address word received by the receiving location can be subdivided into s address word segments with b segment bit locations each, wherein b=n/s and n is an integral multiple of s;

a decoder having a decoder input adapted to be fed with the segment bit pattern of the respective address word segment of the particular address word to be examined for acceptance, for decoding thereof in accordance with a predetermined decoding algorithm, and having a decoder output at which, for each of the possible segment bit patterns, a decoder output bit pattern representing only this segment bit pattern is available;

s filter registers, each associated with one of the address word segments, for storing filter register bit patterns each corresponding to one of all those decoder output bit patterns that are created in decoding all those segment bit patterns that may occur in the respectively associated address word segment of all address words that are acceptable for the receiving location being considered;

a comparison apparatus through which the decoder output bit pattern resulting from decoding of the segment bit pattern of the respective address word segment can be compared with the contents of the respective associated filter register, to determine whether or not the decoder output bit pattern resulting from the respective decoding operation conforms with one of the filter register bit patterns stored in this filter register, and at the output of which an examination result signal is available which, in accordance with the particular examination result, is either a conformity signal or a non-conformity signal;

and an evaluation device which, upon decoding of all address word segments belonging to the respective address word received, delivers an acceptance signal only when a conformity signal has been present at the output of the comparison means for each address word segment of this address word.

In a preferred embodiment of the invention, the decoder comprises b decoder input terminals adapted to be fed during each address word segment with one of the b segment bits thereof each, as well as $2^b$ decoder output terminals at which a binary value pattern occurs upon each decoding operation, such that a first binary value, for example "1", occurs at one of the decoder output terminals and the opposite binary value, for example "0", occurs at all remaining decoder output terminals. The filter registers each comprise $2^b$ filter register locations associated with one of the $2^b$ decoder output terminals each. In each of the filter registers all those filter register locations serve for storing the first binary value at the respective decoder output terminals where the first binary value occurs for those segment bit patterns which may occur in all address words that are acceptable for the receiving location being considered, in the respectively associated address word segment. The remaining filter register locations of each filter register serve for storing the opposite binary value. The comparison means delivers a conformity signal for the respective address word segment decoded, when the first binary value is present in that filter register location of the associated filter register which belongs to the decoder output delivering the first binary value of the respective decoder output bit pattern.

The address word segments of the respective address word to be examined for acceptance may be feedable to the decoder input terminals successively in segment clock fashion, and the filter registers associated with the individual address word segments are adapted to be connected to the comparison means successively in segment clock fashion.

In an embodiment of the invention, the comparison apparatus comprises $2^b$ AND elements having two AND inputs and one AND output each. In each AND element, a first AND input is coupled to the corresponding one of the decoder output terminals, and another AND input is adapted to be coupled to the corresponding filter register location of the filter register coupled to the comparison apparatus.

In an embodiment of the invention, the evaluation device comprises:

an OR element having $2^b$ OR inputs each coupled to one of the AND outputs, and an OR output at which the respective examination result signal is available; an examination result register having s result register locations into which the examination result signals for the individual address word segments can be written successively; and an AND circuit having s AND circuit inputs which are coupled to one of the result register locations each, and an AND circuit output at which, upon examination of the last address word segment of the respective address word, the first binary value is available in case of acceptance of the particular address word examined and the opposite binary value is available in case of non-acceptance.

There may be provided a switch through which the individual filter registers are successively coupled to the comparison apparatus.

The invention provides furthermore a method for selection of address words, each having n bit locations and serving for addressing m different receiving locations of a digital communications means, in at least one of the receiving locations. Each address word is subdivided into s address word segments; for each address word segment, all segment bit patterns which, in the address words acceptable for the receiving location in consideration, may occur in the respective address word, are decoded in accordance with a predetermined decoding algorithm into a binary value pattern having $2^b$ binary locations; the segment bit patterns of the individual address word segments of the respective address word received are successively decoded each in accordance with the predetermined decoding algorithm into a binary value pattern having $2^b$ binary locations; the respective binary value pattern obtained by decoding is examined with respect to conformity with all binary bit patterns stored for the respective address word segment; and after examination of all address word segments of an address word received, an assessment is carried out for this address word, by way of the examination results for the individual address word segments, as to whether or not the particular address word received is an address word that is acceptable for the receiving location being considered.

In this respect, the binary value pattern obtained in decoding the particular address word segment of the address word received and the acceptable binary value patterns stored for this address word segment may be subjected to an AND operation bit location for bit location and the examination result can be derived from the AND operation result. The AND operation results obtained for each address word segment of the respective address word received can be stored in segmentwise fashion and all AND operation results stored after examination of the last address word segment of the respective address word received may in turn be subjected to an AND operation from the result of which it is possible to derive whether or not the particular address word received is acceptable for the particular receiving location.

BRIEF DESCRIPTION OF THE DRAWINGS

The invention will now be elucidated by way of embodiments more closely. In the drawings.

DETAILED DESCRIPTION OF THE INVENTION

The embodiments illustrated via FIGS. 1–6 operate in the context described with reference to FIGS. 6–9. FIG. 6 is a simplified diagram showing a communications apparatus comprising a transmitter S, a plurality of receiving locations E1, E2, E3 . . . Em and a bus 13, via which transmitter S and receiving locations E1 . . . Em are coupled to each other in series or in a ring. A message transmitted from transmitter S via the bus 13 thus reaches all receiving locations E1 . . . Em. To permit a message transmitted from transmitter S to be sent selectively to individual receiving locations, the message sent out contains not only a message word including several bits, but also an address word including a number of bits. Each receiving device contains an apparatus for examining whether or not the address word of the respective message sent is acceptable for the particular receiving location. In the case of acceptance, the message linked to this address word is received by the accepting receiving location.

Figure 7:
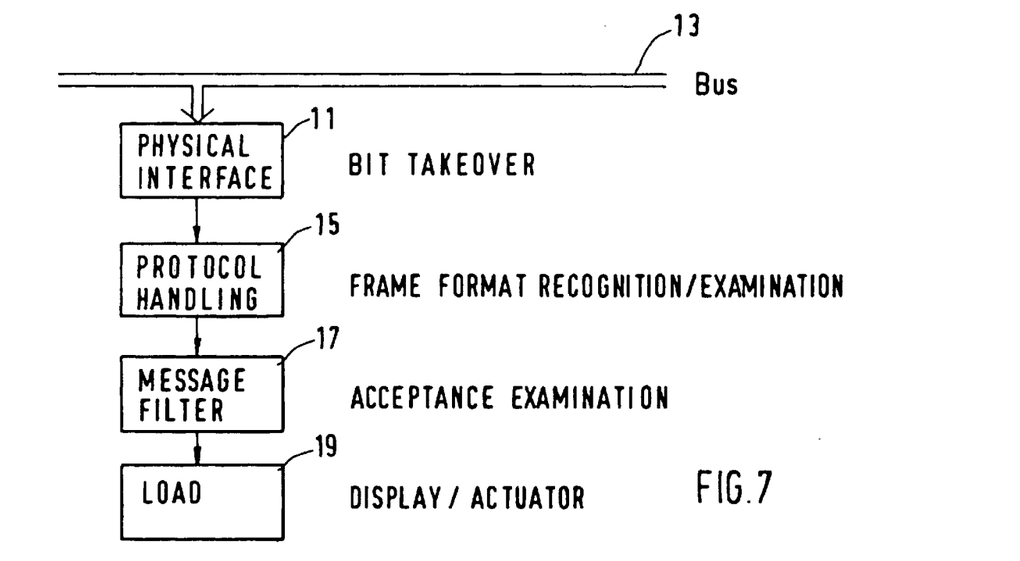
FIG. 7 shows a representation of one of the receiving locations in FIG. 6.

FIG. 7 is a simplified block diagram of one of the receiving locations E1 . . . Em. Such a receiving location has a physical interface 11, via which the bus sequence transmitted via bus 13 is captured. The output signal of physical interface 11 is fed to a so-called protocol handler 15, via which frame format recognition and frame format examination are carried out. The output of protocol handler 15 is followed by a message filter 17 that is used for acceptance testing, i.e., an examination as to whether or not the respective address word transferred is accepted by the receiving location. In case of acceptance, the message transferred with the accepted address word is passed to a load 19, which may be a display device, an actuator or the like. The present invention relates to improvements in message filter 17.

Figure 8:
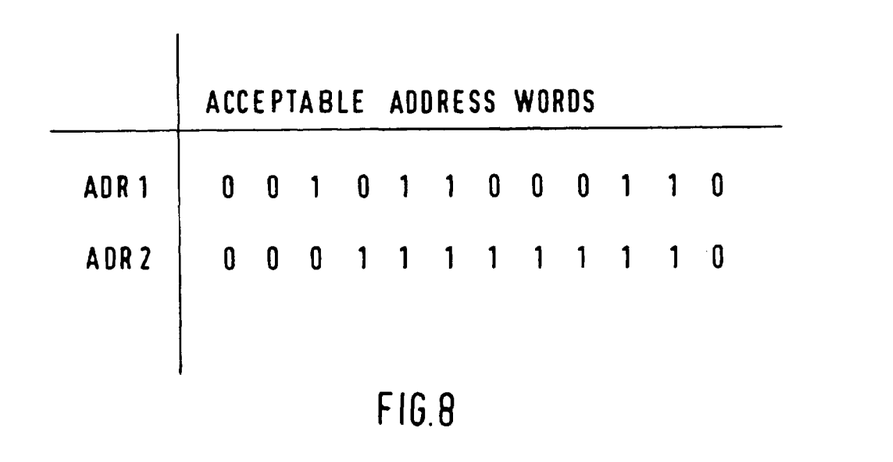
FIG. 8 shows an example of two address words that are acceptable for one receiving location.
Figure 9:
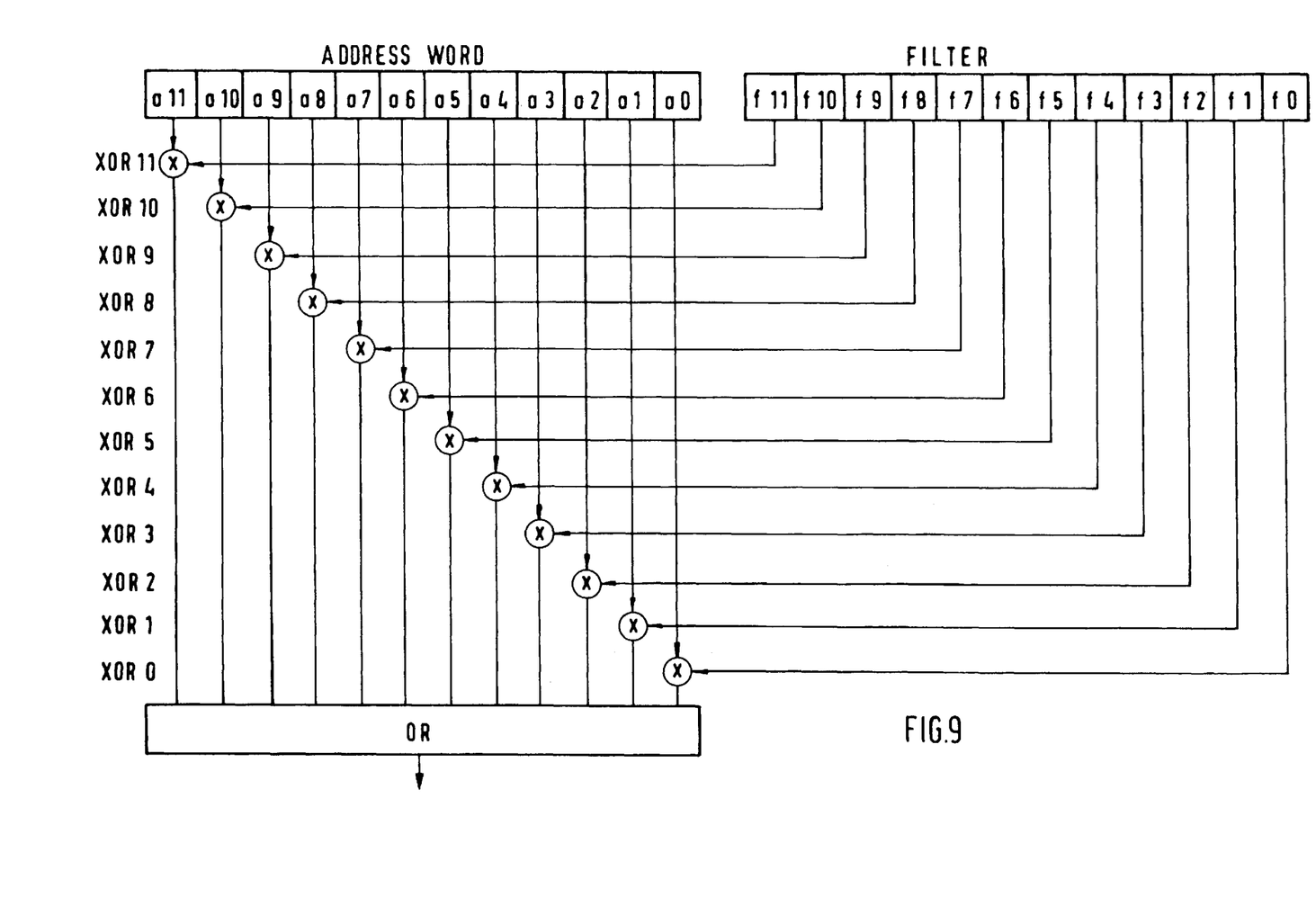
FIG. 9 shows a conventional filter circuit.

FIG. 8 shows an example of two address words ADR0 and ADR1, which are to be accepted by one specific receiving location. FIG. 9 shows a practical realization of an acceptance examination device when there is only one acceptable address word and thus only one single filter is required. When conventional message filters are used for acceptance examination of two address words, two filters with 12 filter bit locations each are necessary for examining whether the respective data word transferred is one of the two acceptable data words or an unacceptable data word. Therefore, two filters with a total of 24 filter locations are necessary. Furthermore, a correspondingly large number of XOR elements and word lines are required on the semiconductor chip in which this receiving location is monolithically integrated.

Figure 1:
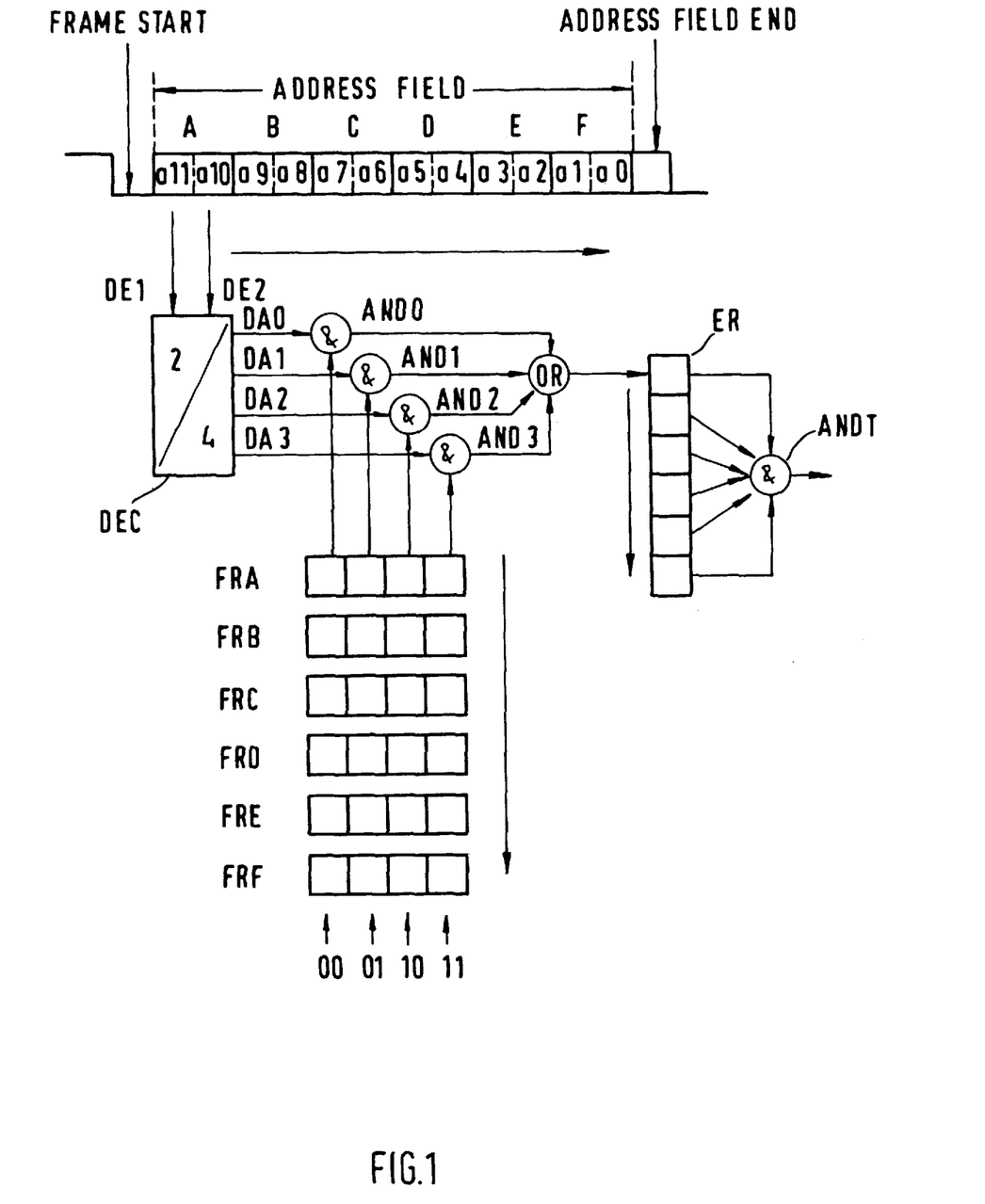
FIG. 1 shows an embodiment of a selection device according to an embodiment of the invention.

A schematic block diagram of a first embodiment of a device according to the invention for acceptance or selection of address words is shown in FIG. 1.

Figure 2:
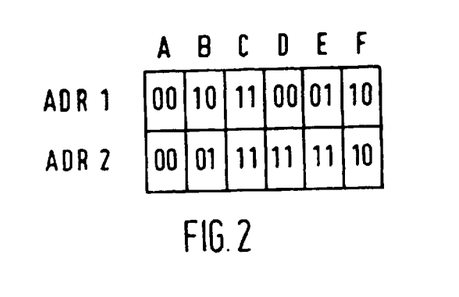
FIG. 2 shows an example of two acceptable address words subdivided into address word segments.

This embodiment is based on the assumption that each address word consists of 12 bit locations, each address word is subdivided into 6 address word segments having 2 bit locations each, and the receiving location is to accept 2 address words as shown in the table of FIG. 2 as examples.

FIG. 1 shows at the top a bit sequence of a message transferred in framewise manner, with each frame comprising a frame start marking bit, an address field with 12 bit locations, an address field marking bit and a message word of predetermined bit length.

FIG. 1 shows just the address field for an address word having 12 address bit locations a0 to a11 and a subdivision into 6 address word segments (also briefly referred to herein as segments) A to F having two bit locations each.

The embodiment shown in FIG. 1 comprises a 4-from-2 decoder DEC having two decoder inputs DE1 and DE2 and four decoder outputs DA0, DA1, DA2, and DA3. Each of the decoder outputs has an AND element AND0, AND1, AND2 and AND3, respectively, associated therewith. Six filter registers FRA to FRF are provided, one for each of the address word segments A to F. Each of the filter registers has four filter register locations, each associated with one of the AND elements AND0 to AND3. The outputs of the AND elements AND0 to AND3 are each coupled to an input of an OR element OR having its output coupled to the input side of an examination result register ER. The examination result register ER comprises, for each address word segment, a result register location, i.e., in total, six result register locations. An output of each one of the result register locations is coupled to one input each of an additional AND element ANDT. At the output of the latter, an acceptance signal is available, the binary value of which is dependent on whether the respective address word examined is acceptable or not.

FIG. 1 shows the address field and an arrow adjacent the filter registers FRA–FRF and another arrow adjacent the examination result register ER, indicating the demultiplex-like, segmentwise processing of the respective address word with the aid of the 4-from-2 decoder DEC. This means that the two decoder inputs DE1 and DE2 are successively fed with the two segment bits each of the individual segments A to F in a specific clock segment. In the same clock segment, the filter registers FRA to FRF associated with the individual segments A to F are successively coupled to AND elements AND0 to AND3. In the same clock segment, the examination result signal for the segment from OR member OR is written into the individual result register location of the transmission result register ER. This repeats for each successive segment. Upon examination of the last segment of the received address word, the 6 examination result signals for the 6 segments A to F are then available at the outputs of the 6 result register locations.

Due to the fact that an AND element issues a logic value "1" at its output only when the logic values supplied to the two inputs thereof have the logic value "1", the OR element OR at the output thereof issues the logic value "1" when, in examining a segment, one of the four AND elements AND0 to AND3 has issued the logic value "1", since the two inputs thereof were each fed with this logic value "1". If the bit pattern of a segment has been recognized to be a bit pattern that may occur in one of the address words that are acceptable for the particular receiving location, the OR element OR writes the logic value "1" into the result register location belonging to this segment. Otherwise, the logic value "0" is written thereinto. Only when an acceptable segment bit pattern has been found for all segments of the received address word do all result register locations contain the logic value "1". Only in this case does the logic value "1" appear at the output of AND element ANDT, indicating conformity of the address word received with an address word acceptable for this receiving location. When a logic value "0" appears at the AND element ANDT, this indicates that the address word received is not identical with any of the address words acceptable for this receiving location.

With segmentwise examination of the received address words for acceptance, one can make do with considerably fewer circuit elements and with considerably fewer word lines. When assuming, for instance, that each address word has an address word length of 12 bit locations and each address word is subdivided into 6 address word segments having 2 segment bit locations each, a preferred embodiment requires only a 4-from-2 decoder having two input lines and four output lines, 4 AND elements, 6 filter registers having 4 filter register locations each, as well as an evaluator for evaluating the AND operation results which, in principle, are composed as in the conventional case, but are considerably less complex, since it does not need to evaluate 32 comparison results, but only 4 comparison results. No XOR elements are necessary, requiring more circuit expenditure and chip area than AND elements. This tremendous saving of circuit units as well as word and connecting lines results in an enormous reduction in area required for such a selection or acceptance device on a monolithically integrated circuit comprising this selection device.

The mode of operation of the embodiment shown in FIG. 1 will now be elucidated in more detail by way of FIGS. 2 to 5.

Decoder DEC delivers at decoder output DA0 thereof the logic value "1" when the inputs DE1 and DE2 thereof are fed with the segment bit pattern "00". For the segment bit patterns "01", "10" and "11" delivered thereto on the input side, decoder DEC delivers a logic value "1" at decoder output DA1 or DA2 or DA3, respectively. With each of these segment bit patterns, the logic value "0" appears at the three other decoder outputs.

In each of filter registers FRA to FRF, storage of the logic value "1" in the filter register location belonging to AND element AND0 represents a segment bit pattern "00", whereas storage of the logic value "1" in a register location belonging to AND element AND1 or AND2 or AND3, respectively, represents a segment bit pattern "01", "10" and "11", respectively.

Figure 3:
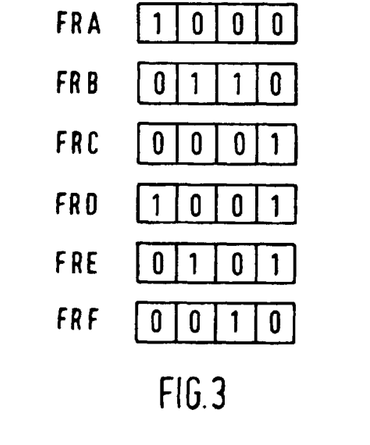
FIG. 3 shows filter registers having various memory contents.

FIG. 2 shows two address words ADR1 and ADR2 which are acceptable for one specific receiving location, each having an address word length of 12 bits each, and which are each subdivided into six segments A to F with two bit locations each. FIG. 3 shows the structure of filter registers FRA to FRF for the case that the two address words shown in FIG. 2 are to be assessed as being acceptable by the selection or acceptance means according to FIG. 1. Due to the fact that both address words ADR1 and ADR2 display the segment bit pattern "00" in segment A, the logic value "1" is contained only in the left-hand filter register location of FRA, which belongs to AND element AND0, whereas the three remaining filter register locations of FRA contain the logic value "0". In segment "B" of the two acceptable address words ADR1 and ADR2, either the segment bit pattern "10" or the segment bit pattern "01" may occur. Accordingly, logic value "1" is present both in the second and third filter register locations of FRB belonging to AND element AND1 and AND element AND2, respectively. The two remaining locations thereof hold logic value "1". In corresponding manner, the logic values "1" and "0" are stored in filter registers FRC to FRF.

Figure 4:
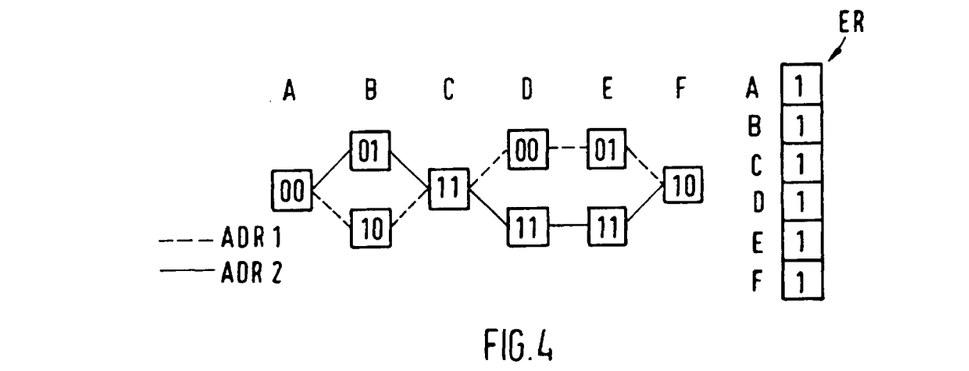
FIG. 4 shows a graphical representation of the examination process for two acceptable address words.

FIG. 4 shows in broken lines an examination process when the receiving location in consideration is fed with the acceptable address word ADR1, and in full line an examination process when the receiving location is fed with the acceptable address word ADR2. In addition thereto, FIG. 4 shows the logic values written into the individual result register locations of the examination result register ER in each of these two examination operations.

When the address word ADR1 is received, the decoder DEC, while being fed at its decoder inputs DE1 and DE2 with the segment bit pattern "00" of address word segment A, issues the logic value "1" at its decoder output DA0. When, during examination of segment A, the AND elements AND0 to AND3 have the filter register locations of filter register FRA connected thereto, a logical "1" appears at the output of AND0, and a logical "1", via OR element OR, is written into the result register location of result register ER belonging to segment A. During decoding of address word segment B, the filter register locations of FRB are coupled to AND0 to AND3, and a logical "1" is generated due to the presence of a logical "1" at the decoder output DA2 and in the filter register location of FRB that is coupled to AND2, and is written into the result register location of examination result register ER corresponding to segment B. The examination and assessment of the remaining segments C through F takes place in the same manner.

The manner in which the filter registers FRA and belonging to the individual address word segments are each coupled to the associated four inputs of the AND elements AND0 to AND3, is not shown in the figures. It is possible to use therefor a controllable switch which is instructed as to which particular segment of the respective address word is to be examined, with the switch being configured during each address word segment such that the filter register belonging to the particular segment is coupled to AND elements AND0 to AND3.

When following the examination processes depicted in FIG. 4 for the two acceptable address words ADR1 and ADR2, one can see that the logic value "1" appears at the end of the examination of the last address word segment F in all result register locations of ER, which, at the output of AND element ANDT, results in logic value "1" indicating acceptance.

Figure 5:
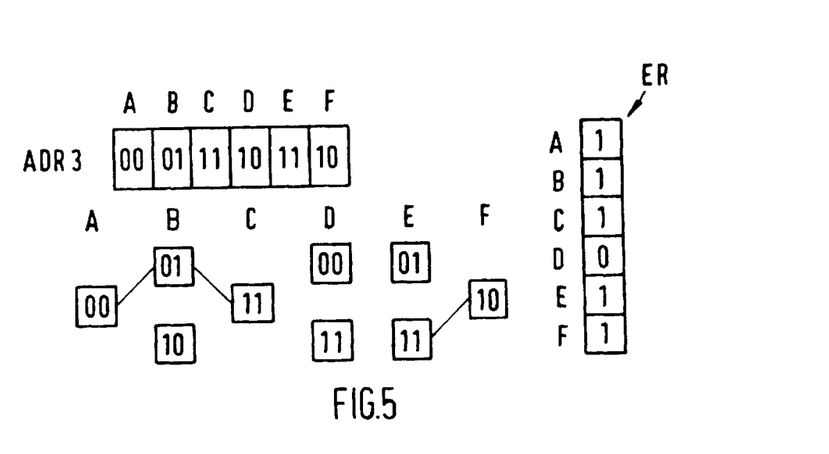
FIG. 5 shows a graphical representation of a non-acceptable address word and an examination process therefor.
Figure 6:
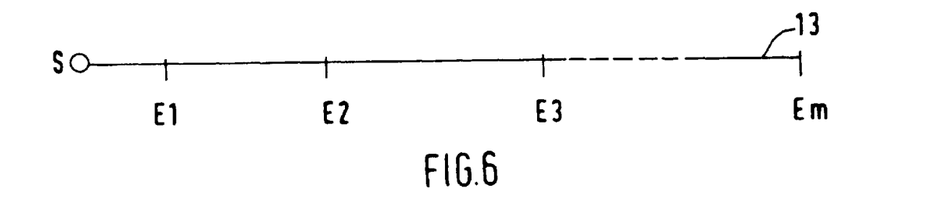
FIG. 6 shows a schematic general representation of a transmission channel having a transmitting location and several receiving locations in a known manner.

FIG. 5 shows an examination process for an address word ADR3 which does not belong to the address words that are acceptable for the receiving location in consideration. This address word ADR3 is identical with address word ADR2 in all segments excluding segment D. This is why a logical "0" appears at the result register location associated with segment D, whereas a logical "1" appears in all other result register locations. Due to the logical "0" in the result register location belonging to segment D, a logical "0" appears at the output of AND element ANDT, which signals nonconformity of the address word ADR3 with one of the acceptable address words ADR1 and ADR2 and, thus, non-acceptance of the address word ADR3.

What is claimed is:

1. A device for the selection of address words, each having n bit locations and serving for addressing m different receiving locations of a digital communications means, in at least one of the receiving locations, comprising a digital acceptance means via which address words can be selected which are acceptable for the particular receiving location in consideration, with said acceptance means comprising:

a) an address word segmenting means through which each address word received by the receiving location can be subdivided into s address word segments with b segment bit locations each, wherein b=n/s and n is an integral multiple of s;

b) a decoder having a decoder input adapted to be fed with the segment bit pattern of the respective address word segment of the particular address word to be examined for acceptance, for decoding thereof in accordance with a predetermined decoding algorithm, and having a decoder output at which, for each of the possible segment bit patterns, a decoder output bit pattern representing only this segment bit pattern is available;

c) s filter registers associated with one of the address word segments each, for storing filter register bit patterns each corresponding at least to one of all those decoder output bit patterns that are created in decoding of all those segment bit patterns that may occur in the respectively associated address word segment of all address words that are acceptable for the receiving location in consideration;

d) a comparison means through which the decoder output bit pattern resulting from decoding of the segment bit pattern of the respective address word segment can be compared with the contents of the respectively associated filter register, to the effect whether or not the decoder output bit pattern resulting from the respective decoding operation is in conformity with one of the filter register bit patterns stored in this filter register, and at the output of which an examination result signal is available which, in accordance with the particular examination result, is either a conformity signal "1" or a non-conformity signal "0"; and e) an evaluation means which, upon decoding of all address word segments belonging to the respective address word received, delivers an acceptance signal only when a conformity signal has been present at the output of the comparison means for each address word segment of this address word.

2. A device according to claim 1, in which a) the decoder comprises b decoder input terminals adapted to be fed during each address word segment with one of the b segment bits thereof each, as well as $2^b$ decoder output terminals at which a binary value pattern occurs upon each decoding operation, such that a first binary value occurs at one of the decoder output terminals and the opposite binary value occurs at all remaining decoder output terminals;

b) the filter registers each comprise $2^b$ filter register locations associated with one of the $2^b$ decoder output terminals each, and in each of the filter registers all those filter register locations serve for storing the first binary value at the respectively associated decoder output terminals of which occurs the first binary value for those segment bit patterns which may occur in all address words that are acceptable for the receiving location in consideration, in the respectively associated address word segment, whereas the remaining filter register locations of each filter register serve for storing the opposite binary value; and c) the comparison means delivers a conformity signal for the respective address word segment decoded, when the first binary value is present in that filter register location of the associated filter register which belongs to the decoder output terminal delivering the first binary value of the respective decoder output bit pattern.

3. A device according to claim 2, in which the address word segments of the particular address word to be examined for acceptance are adapted to be fed to the decoding input terminals successively in segment clock fashion, and the filter registers associated with the individual address word segments are adapted to be coupled to the comparison means successively in segment bit fashion.

4. A device according to claim 3, in which a switch means is provided through which the individual filter registers are connectable to the comparison means successively in segment clock fashion.

5. A device according to claim 4, in which the comparison means comprises $2^b$ AND elements each having two AND inputs and one AND output, and in each AND element a first AND input is coupled to the respectively corresponding one of the decoder output terminals, and another AND input is adapted to be coupled to the respectively corresponding filter register location of the respective filter register coupled to the comparison means.

6. A device according to claim 5, in which the evaluation means comprises:

a) an OR element having $2^b$ OR inputs each coupled to one of the AND outputs, and an OR output at which the respective examination result signal is available;

b) an examination result register having s result register locations into which the examination result signals for the individual address word segments can be written successively in segment clock fashion; and c) an AND circuit having s AND circuit inputs which are coupled to one of the result register locations of the examination result register each, and an AND circuit output at which, upon examination of the last address word segment of the respective address word, the first binary value is available in case of acceptance of the particular address word examined and the opposite binary value is available in case of non-acceptance.

7. A method of selecting address words, each having n bit locations and serving for addressing m different receiving locations of a digital communications means, in at least one of the receiving locations, in which a) each address word is subdivided into s address word segments each having b segment bit locations;

b) for each address word segment, all segment bit patterns which, in the address words acceptable for the receiving location in consideration, may occur in the respective address word segment, are decoded in accordance with a predetermined decoding algorithm into a binary value pattern having $2^b$ binary locations, and these binary value patterns are stored;

c) the segment bit patterns of the individual address word segments of the respective address word received are decoded each in accordance with the predetermined decoding algorithm, successively in segment clock fashion, into a binary value pattern having $2^b$ binary locations;

d) the respective binary value pattern obtained by decoding is examined with respect to conformity with all binary bit patterns stored for the respective address word segment; and e) after examination of all address word segments of an address word received, an assessment is carried out by way of the examination results for the individual address word segments of this address word, as to whether or not the particular address word received is an address word that is acceptable for the receiving location in consideration.

8. A method according to claim 7, in which the binary value pattern obtained in decoding the respective address word segment of the address word received and the acceptable binary value patterns stored for this address word segment are subjected to an AND operation bit location for bit location, and the examination result thus obtained is derived from the AND operation result.

9. A method according to claim 8, in which the AND operation results obtained for each address word segment of the respective address word received are stored in segmentwise fashion, and all AND operation results stored after examination of the last address word segment of the respective address word received in turn are subjected to an AND operation, from the result of which it is derived whether or not the respective address word received is acceptable for the receiving location in consideration.

10. A device comprising:
an address segmenting device coupled to a digital reception site, said address segmenting device segmenting an address word received at said reception site into a set of address word segments, wherein said set includes all information contained in said address word;
a decoder having an input accepting one of said address word segments at a time and having multiple output lines, where said decoder decodes said address word segments to select one of said multiple output lines to be set to a first logical state;
a series of filter registers, one for each address word segment, storing filter register bit patterns corresponding to address word segments associated with said reception site, wherein each of said series of filter registers includes multiple outputs, one each for each one of said multiple output lines, each of said multiple filter outputs providing a logical signal;
a comparison circuit comparing each of said multiple output lines and a logical signal from one of said filter registers corresponding to that address word segment currently being analyzed, said comparison circuit providing a conformity output signal when one of said multiple output lines and a corresponding one of said logical signals from said filter register both exhibit said first logical state; and
an evaluation apparatus coupled to said comparison circuit, said evaluation apparatus delivering an acceptance signal when all address word segments comprising said address word have been analyzed and each address word segment has yielded a conformity signal.

11. An apparatus as claimed in claim 10 wherein said decoder decodes said address word segments to select one of said multiple output lines to be set to a first logical state with a remainder of said multiple output lines set to a second logical state.

12. An apparatus as claimed in claim 10 wherein said decoder comprises a multiplexing circuit having N inputs, where N is a bit length of each of said segments, and having M outputs, where $M=2^N$, and wherein said address word segments are coupled, one bit per input, to said N inputs.

13. An apparatus as claimed in claim 12 wherein said comparison circuit comprises:
a series of M AND gates, wherein one input of each AND gate is coupled to one of said M outputs and another input of each AND gate is coupled to a corresponding one of said multiple output lines of said filter register; and
an OR gate having M inputs, one each of said M inputs coupled to a corresponding output of one of said series of M AND gates.

14. An apparatus as claimed in claim 13 wherein said evaluation apparatus comprises:
a shift register having an input coupled to an output of said OR gate, said shift register being clocked in synchrony with said address segmenting device, said shift register including a cell for each of said address word segments; and
a final AND gate including an input for each of said address word segments, each of said final AND gate inputs coupled to a corresponding one of said cells.

15. An apparatus as claimed in claim 10 wherein said address segmenting device segments said address word into a set of contiguous, equal-length address word segments comprising two or more bits.

16. An apparatus as claimed in claim 12 wherein said address segmenting device segments said address word into a set of M-bit long address word segments.

17. A method comprising:
receiving an address word;
segmenting said address word into a set of address word segments, said set including all information contained in said address word;
decoding each of said address word segments in turn to provide a first logical value on one of a multiplicity of signal lines;
comparing a signal on each of said multiplicity of signal lines with a corresponding signal from an address filter register to provide a series of comparison results;
combining said comparison results to provide a conformity signal having a first value when a bit pattern of an address word segment conforms to a portion of an acceptable address word, or a second value when said bit pattern does not conform to an acceptable address word; and
evaluating conformity signals for all address word segments of said address word to provide an acceptance signal when all of said conformity signals have said first value.

18. A method as claimed in claim 17 wherein said step of segmenting said address word includes a step of segmenting said address word into contiguous address word segments of N bits.

19. A method as claimed in claim 17 wherein said step of comparing a signal on each of said multiplicity of signal lines with a corresponding signal from an address filter register includes a step of ANDing a signal on each of said multiplicity of signal lines with a corresponding signal from an address filter register to provide a series of comparison results.

20. A method as claimed in claim 19 wherein said step of combining said comparison results to provide a conformity signal includes a step of providing said series of comparison results to a corresponding series of inputs to an OR gate to provide said conformity signal at an output of said OR gate.

21. A method as claimed in claim 20 wherein said step of evaluating conformity signals for all address word segments of said address word includes steps of:
providing said conformity signal from each address word segment to an input of a shift register, said shift register having one cell for each of said address word segments; and
coupling each cell of said shift register to an input of an AND gate, to provide said acceptance signal at an output of said AND gate.

* * * * *